United States Patent
Kang

(10) Patent No.: US 8,107,134 B2
(45) Date of Patent: Jan. 31, 2012

(54) READ DEVICE, IMAGE FORMING APPARATUS AND METHOD OF CONTROLLING THE IMAGE FORMING APPARATUS

(75) Inventor: Kyung Pyo Kang, Suwon-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 982 days.

(21) Appl. No.: 12/053,730

(22) Filed: Mar. 24, 2008

(65) Prior Publication Data

US 2009/0027740 A1 Jan. 29, 2009

(30) Foreign Application Priority Data

Jul. 24, 2007 (KR) .................. 10-2007-0074164

(51) Int. Cl.
*H04N 1/04* (2006.01)

(52) U.S. Cl. ......... 358/474; 358/496; 358/497; 358/498

(58) Field of Classification Search .................. 358/474, 358/496, 497, 498

See application file for complete search history.

(56) References Cited

U.S. PATENT DOCUMENTS

| | | | |
|---|---|---|---|
| 6,438,350 B1 * | 8/2002 | Hasegawa et al. | 399/374 |
| 2006/0197997 A1 * | 9/2006 | Oshida et al. | 358/498 |

FOREIGN PATENT DOCUMENTS

JP 2005-153174 6/2005

* cited by examiner

*Primary Examiner* — Houshang Safaipour

(74) *Attorney, Agent, or Firm* — Stanzione & Kim, LLP

(57) ABSTRACT

A transfer member to transfer a document at different transfer speeds according to transfer sections of a document transfer path includes a first transfer roller and a second transfer roller, both of which are respectively mounted at upstream and downstream sides of the document transfer path, and a driving unit to drive the first and second transfer rollers such that the speed of the second transfer roller is higher than that of the first transfer roller under the control of a control unit is further included. The control unit reads an image pattern on a test document using a read device, acquires speed compensation information to compensate for a transfer speed of the transfer member, and controls an operation of the transfer member according to the speed compensation information at the time of transferring the document.

25 Claims, 6 Drawing Sheets

READ DEVICE, IMAGE FORMING APPARATUS AND METHOD OF CONTROLLING THE IMAGE FORMING APPARATUS

CROSS-REFERENCE TO RELATED APPLICATIONS

This application claims the benefit under 35 U.S.C. §119 (a) from Korean Patent Application No. 2007-74164, filed on Jul. 24, 2007 in the Korean Intellectual Property Office, the disclosure of which is incorporated herein by reference.

BACKGROUND OF THE INVENTION

1. Field of the Invention

The present general inventive concept relates to a read device, an image forming apparatus having the same, and a method of controlling the image forming apparatus, which are capable of preventing deterioration of quality of a read image in a process of transferring a document and reading an image of the document.

2. Description of the Related Art

Generally, an image forming apparatus such as a copier, a printer or a facsimile machine includes a reading function to read data recorded on a document.

A method of reading both sides of a document includes a method of reading an image on one side of a document and reading an image on the other side of the document using a single image sensor while changing a transfer direction of the document and a method of reading images on front and back sides of a document transferred along a document transfer path using a plurality of image sensors which are provided on the document transfer path so as to face each other.

Generally, a first transfer roller and a second transfer roller are mounted on a document transfer path. A document is transferred by driving the first and second transfer rollers and information recorded on the transferred document is read by an image sensor. While the document is read, the first and second transfer rollers are driven at the same speed and a read speed of the image sensor is set according to the speed of the transfer rollers. The document is transferred along the transfer path at a transfer speed determined by the first and second transfer rollers.

Due to mechanical tolerance in a process of assembling components of the apparatus, a transfer speed of a document varies and thus the quality of an image read by a fixed image sensor deteriorates. That is, if the transfer speed of the document passing through the image sensor is excessively low, a phenomenon that the length of the read image is increased occurs and, if the transfer speed of the document is excessively high, a phenomenon that the length of the read image is decreased occurs. Thus, the quality of the read image deteriorates.

Accordingly, in order to obtain a high-quality read image, the deterioration of quality of the read image should be corrected.

SUMMARY OF THE INVENTION

The present general inventive concept provides a read device, an image forming apparatus having the same, and a method of controlling the image forming apparatus, which are capable of preventing deterioration of quality of a read image in a process of transferring a document and reading an image of the document.

Additional aspects and/or advantages of the invention will be set forth in part in the description which follows and, in part, will be obvious from the description, or may be learned by practice of the invention.

The foregoing and/or other aspects and utilities of the present general inventive concept can be achieved by providing a read device including a first transfer unit mounted on a document transfer path along which a document transferred, a first reading unit to read a first side of the document, a second reading unit to read a second side of the document; and a second transfer unit, wherein the first transfer unit, the first reading unit, the second reading unit and the second transfer unit are sequentially arranged in order, wherein the first transfer unit transfers the document at a first transfer speed, the second transfer unit transfers the document at a second transfer speed, and one of the first reading unit and the second reading unit reads an image on the document according to one of the first transfer speed and the second transfer speed.

The second transfer speed may be higher than the first transfer speed.

The second transfer unit may transfer the document at the second transfer speed after the document passes through the first transfer unit.

When the document is transferred by the first and second transfer units, the document may be transferred at a third transfer speed.

The third transfer speed may be higher than the first transfer speed and may be lower than the second transfer speed.

While a back end of the document is transferred to the first reading unit after passing through the first transfer unit, at least one of the first and second reading units may correct a read image.

While a back end of the document is transferred to the second reading unit after passing through the first transfer unit and the first reading unit, the second reading unit may correct a read image.

The read device may further include at least one document detection sensor to sense a transfer position of the document, and the document detection sensor may be provided at a front stage or a back stage of at least one of the first and second transfer units.

The foregoing and/or other aspects and utilities of the present general inventive concept may also be achieved by providing an image forming apparatus including a test document on which an image pattern is recorded; a transfer member to transfer a document along a document transfer path, a read device to read an image on the document transferred by the transfer member, and a control unit to read the image pattern on the test document transferred along the document transfer path using the read device, acquire speed compensation information to compensate for a transfer speed of the transfer member, and control an operation of the transfer member according to the speed compensation information at the time of transferring the document.

The transfer member may include first and second transfer rollers which are respectively mounted at upstream and downstream sides of the document transfer path, and a driving unit to drive the first and second transfer rollers such that the speed of the second transfer roller is higher than that of the first transfer roller, under the control of the control unit, is further included.

The read device may include a plurality of image sensors which are mounted between the first transfer roller and the second transfer roller to be separated from each other, and the image pattern may be read by the plurality of image sensors, the control unit may analyze the image pattern read by the image sensors and acquire speed compensation information of the first and second transfer rollers.

The image pattern may include a plurality of bands recorded at a predetermined gap, and the control unit may calculate transfer times of the document using a clock having a predetermined frequency while any one band and a next band thereof are recognized by the image sensor.

The control unit may calculate a transfer speed using the gap between the bands and an average transfer time obtained by arithmetically averaging the transfer times of the document.

In a first transfer speed which depends on only the first transfer roller, a second transfer speed which depends on only the second transfer roller and a third transfer speed which depends on the first and second transfer rollers, the control unit may acquire a first speed compensation value to compensate for a difference between the first transfer speed and a transfer speed which is calculated in correspondence therewith and a second speed compensation value to compensate for a difference between the second transfer speed and a transfer speed which is calculated in correspondence therewith as speed compensation information.

The foregoing and/or other aspects and utilities of the present general inventive concept may also be achieved by providing a method of controlling an image forming apparatus including a transfer member to transfer a document and a read device to read an image on the document transferred by the transfer member, the method including driving the transfer member at a predetermined transfer speed and transferring a test document on which an image pattern is recorded, reading the image pattern on the test document by the read device, analyzing the image pattern read by the read device, and acquiring speed compensation information of the transfer member, storing the acquired speed compensation information; and controlling the transfer member according to the stored speed compensation information when the image on the document is read.

The image pattern may include bands recorded at a predetermined gap, and the analyzing of the image pattern may include calculating a compensation value according to a difference between a transfer speed of the document in a transfer section and a predetermined speed.

The foregoing and/or other aspects and utilities of the present general inventive concept may also be achieved by providing an image forming apparatus including a first transfer unit and a second transfer unit to transfer a document along a transfer path at a first transfer speed and a second transfer speed, respectively, a first reading unit and a second reading unit disposed between the first transfer unit and the second transfer unit to read a first side and a second side of the document at the first transfer speed and the second transfer speed, respectively, and a control unit to generate first and second image according to the read first and second sides of the document.

The document may include a test document having predetermined patterns, the first and second reading units read the predetermined patterns of the test document, and the control unit may generate compensation information according to the read predetermined patterns of the test document, and generate the first and second images according to the compensation information.

The control unit may change first and second sub-images of the read first and second sides of the document at first and second speeds to the first and second images having a same size of the document.

The control unit may correct first and second sub-images of the read first and second sides of the document to the first and second images to correspond to the document.

The control unit may compensate the first and second images for a difference between the first and second transfer speeds, so that the first and second images correspond to original size of the document.

The control unit may control the first and second reading units to read the first and second sides transferred at the first and second speeds, at a predetermined speed to generate the first and second images to correspond to the document.

The first and second transfer units may transfer the document at a third speed, the first and second reading units may read the document at the third speed, and the control unit may generate the first and second images according to the read document the third speed.

The first reading unit may read a plurality of portions of the first side of the document at different first speeds, the second reading unit may read a plurality of portions of the second side of the document at different second speeds, and the control unit may generate the first and second images according to the plurality of portions of the first and second sides of the document at the different first and second speeds.

The foregoing and/or other aspects and utilities of the present general inventive concept may also be achieved by providing an image forming apparatus including a first reading unit to read a first side of a document at a first transfer speed, and a second reading unit to read a second side of a document at a second transfer speed.

The foregoing and/or other aspects and utilities of the present general inventive concept may also be achieved by providing an image forming apparatus including a reading unit to read a portion of a document at a speed and to read another portion of the document at another speed.

BRIEF DESCRIPTION OF THE DRAWINGS

These and/or other aspects and utilities of the general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
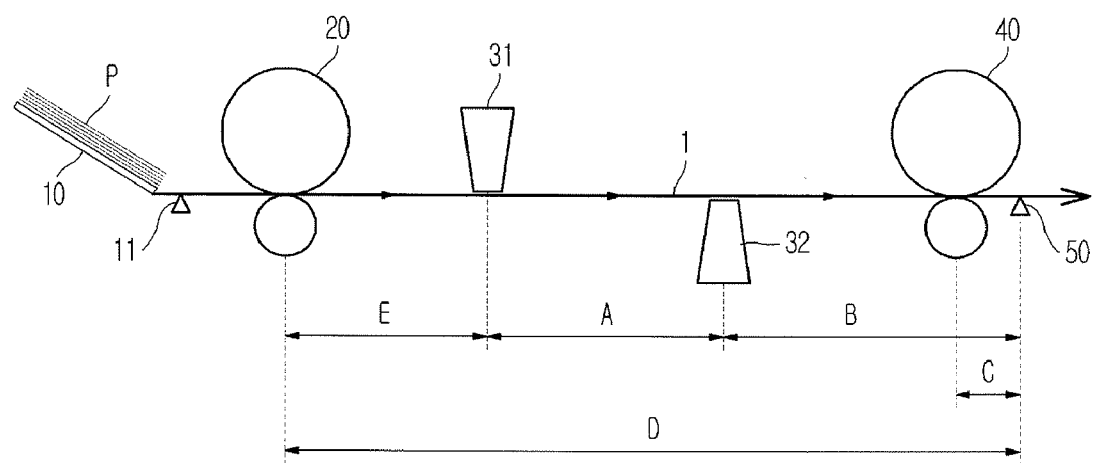
FIG. 1 is a view illustrating an operation to read both sides of a document using a read device included in an image forming apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below to explain the present general inventive concept by referring to the figures.

Hereinafter, a read device (or a scanning device), an image forming apparatus having the same, and a method of controlling the image forming apparatus according to the present general inventive concept will be described.

As illustrated in FIG. 1, a read device (or a scanning device) according to the present embodiment includes a plurality of image sensors 31 and 32 mounted on a document transfer path 1, in order to achieve a double-side reading function. The read device is not limited to a read device including the plurality of image sensors. The read device may use a method of reading double-side images using a single image sensor. The read device may be usable with an image forming apparatus.

The image sensor may be a device to read an image and convert the read image into data which can be stored and output, such as a charge coupled device (CCD) or a contact image sensor (CIS).

A document P is laid on a document loading table 10 and a document load detecting unit 11 detects whether the document P is loaded. The document P may be a sheet of paper to be read or scanned by the image sensors 31 and 32.

If the document P is loaded, the document P is transferred to a first transfer roller 20 by a pickup roller (not illustrated). The document P is transferred along the document transfer path 1 by the rotation of the first transfer roller 20 and a second transfer roller 40.

The first image sensor 31 reads a front-side image at an upper side of the document P transferred along the document transfer path 1 and the second image sensor 31 reads a back-side image at a lower side of the document P transferred along the document transfer path 1. The image read operations of the first and second image sensors 31 and 32 may be simultaneously performed.

The document P passing through the second image sensor 32 is transferred to the second transfer roller 40 along the transfer path 1 and is ejected to a sheet cassette (not shown). The document passing through the second transfer roller 40 is detected by a document detection sensor 50.

A total transfer section D in which the document P is transferred is divided into a section E between the first transfer roller 20 and the first image sensor 31, a section A between the first image sensor 31 and the second image sensor 32, a section B between the second image sensor 32 and the second transfer roller 40, and a section C between the second transfer roller 40 and the document detection sensor 50.

Although the document detection sensor 50 is positioned on the document transfer path at a downstream of the second transfer roller 40 as illustrated in FIG. 1, the document detection sensor 50 may be positioned on the same position as the second transfer roller 40 or may be positioned between the second image sensor 32 and the second transfer roller 40. The document detection sensor 50 generally uses a photo-sensor to sense transmission of light, such as a photo-coupler, but may use a sensor to sense the document, such as a charge amount detection sensor, a reflection amount detection sensor, a transmissivity detection sensor, a thickness detection sensor, a pressure sensor or a piezo-sensor.

Figure 2:
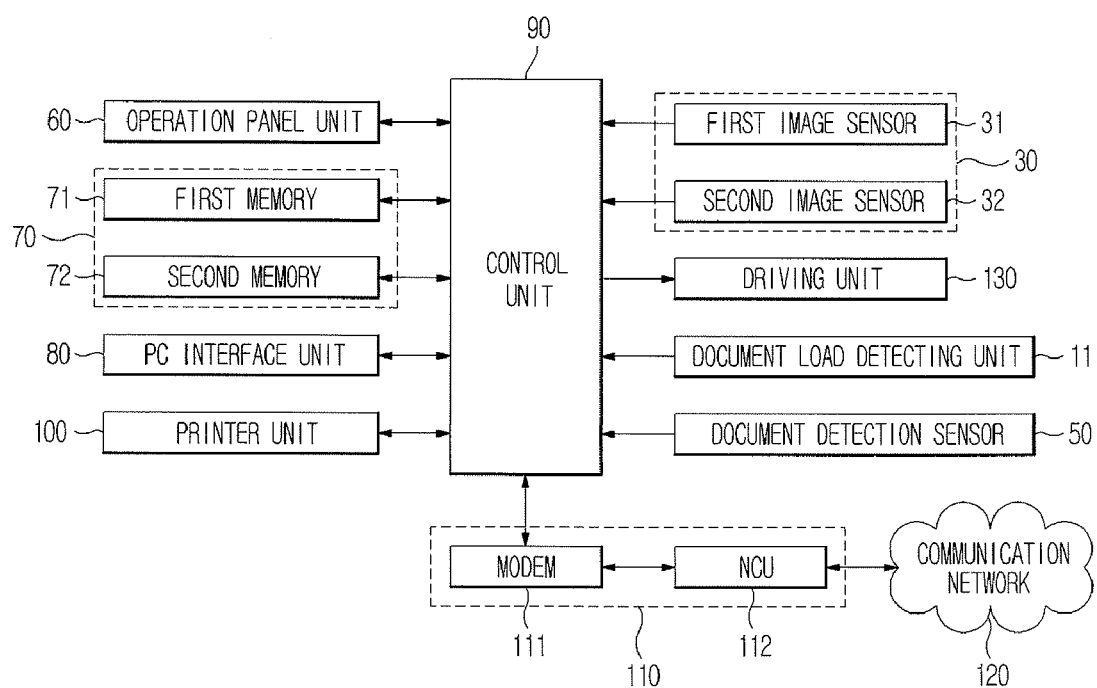
FIG. 2 is a block diagram illustrating the image forming apparatus including the read device of FIG. 1 according to an embodiment of the present general inventive concept.

Referring to FIGS. 1 and 2, the image forming apparatus according to the present embodiment includes an image reading unit 30 to read double-side images of the document P using the first and second image sensors 31 and 32. The image forming apparatus includes a PC interface unit 80, a printer unit 100 and a facsimile unit 110, to perform additional functions to process the read image.

An operation panel unit 60 is a display device to display function keys to set an input command by the selection of a user and an operation state of the apparatus and may be implemented by a liquid crystal display (LCD). The operation panel unit 60 may set or generate the input command by the user manipulation and may be implemented by a touch screen to display predetermined data as well as a read image. The operation panel unit 60 may be included in the image forming apparatus or may be a display unit included in a PC or server, a control device (an external device to control the image forming apparatus or an external control device), a broadcasting receiver (a device connected to the image forming apparatus, such as a digital multimedia broadcasting (DMB) device or an air-wave receiver), or an image photographing device (a digital camera or the like), to interface with the image forming apparatus.

A memory unit 70 stores a variety of programs necessary to perform the operation of the image forming apparatus and data related thereto and includes a first memory 71 and a second memory 72. The first memory 71 stores the variety of control programs necessary to implement the function of the image forming apparatus. Generally, the first memory 71 may be a non-volatile memory device such as a ROM. The second memory 72 temporarily stores a variety of data, generated during the operation of the image forming apparatus, and information on the data. Generally, the second memory 72 may be a volatile memory device such as a DRAM.

Similar to the operation panel unit 60, the memory unit 70 may be included in the image forming apparatus or may be included in an external device to interface with the image forming apparatus. For example, the memory unit 70 may be a memory unit included in a PC or server, a control device (an external device to control the image forming apparatus or an external control device), a broadcasting receiver (a device connected to the image forming apparatus, such as a digital multimedia broadcasting (DMB) device or an air-wave receiver), an image photographing device (a digital camera or the like), or an external memory (a USB memory, a SD memory or the like), to interface with the image forming apparatus.

The PC interface unit 80 connects the image forming apparatus to an external device and is generally connected to a parallel port of a user's computer. The PC interface unit 80 performs communication with the external device, receives print data from the external device, and transmits print information of the print data to the external device.

The printer unit 100 is operated when a print function is performed, and performs an operation to print image data read by the image reading unit 30 under the control of the control unit 90.

The facsimile unit 110 includes a modem 111 and a network control unit (NCU) 112. The modem 111 decodes fax data received from an external device connected to a communication network 120 via the NCU 112. The modem 111 encodes fax data to be transmitted to the external device to a form which can be transmitted via the communication network 120.

The facsimile unit 110 may be integrally mounted with the image forming apparatus or may be externally connected to the image forming apparatus. For example, the facsimile unit 110 may be a facsimile unit included in a PC or server, a control device (an external device to control the image forming apparatus or an external control device), a broadcasting receiver (a device connected to the image forming apparatus, such as a digital multimedia broadcasting (DMB) device or an air-wave receiver), or an image photographing device (a digital camera or the like), to interface with the image forming apparatus.

The NCU 112 is connected between the modem 111 and the communication network 120 so as to transmit/receive fax data. Here, the communication network 120 may be a public switched telephone network (PSTN) or a wired/wireless communication network.

A driving unit 130 includes at least one motor to drive the pickup roller (not illustrated) and the first and second transfer roller 20 and 40, and drives the motor so as to rotate the first transfer roller 20 and the second transfer roller 40 under the control of the control unit 90. The control unit 90 sets a rotation speed of the second transfer roller 40 to be higher than a rotation speed of the first transfer roller 20 such that a first transfer speed of the document transferred by the first transfer roller and a second transfer speed of the document transferred by the second transfer roller are different from each other in order to prevent the document from crumpling in the process of transferring the document. Information on the transfer speed is previously stored in the memory unit 70.

Returning to FIG. 1, the transfer speed of the document P may be three transfer speeds corresponding to the respective transfer sections.

When a front end of the document P transferred along the transfer path 1 enters the first transfer roller 20, the document P is transferred by only the first transfer roller 20 and one or more images recorded on front portions of a front side and a back side of the document P are read by the first image sensor 31 and the second image sensor 32. At this time, a document transfer speed corresponds to a first transfer speed and is called a document front-end speed Vt. The first transfer speed may be a relatively low transfer speed.

When a back end of the document P passes through the first transfer roller 20, the document P is transferred by only the second transfer roller 40, and the images recorded on back portions of the front side and the back side are read by the first and second image sensors 31 and 32. At this time, the document transfer speed corresponds to a second transfer speed which is higher than the first transfer speed and is called a document back-end speed Ve.

When the front end of the transferred document P enters the second transfer roller 40 and the back end of the document P is transferred by the first transfer roller 20, the front end of the document is transferred by the second transfer roller 40 and the back end of the document P is transferred by the first transfer roller 20 and images recorded on middle portions of the front side and the back side of the document P are read by the first and second image sensors 31 and 32. At this time, the document transfer speed corresponds to a third transfer speed which is higher than that of the first transfer roller 20 and the lower than that of the second transfer roller 40 and is called a document reference speed Vn.

In the present embodiment, since the transfer speed of the document P transferred by the first transfer roller is different from the transfer speed of the document P transferred by the second transfer roller, the transfer speed of the document varies in the process of transferring the document P along the transfer path 1. Accordingly, the operation to read the image by a first reading unit (first image sensor 31) and a second reading unit (second image sensor 32) needs to be corrected according to the variation in transfer speed.

When the document P is transferred at the second transfer speed while the back end of the document P is transferred to the first reading unit after passing through the first transfer roller 20, at least one of the first and second reading units 31 and 32 corrects the read image such that a length of the read image is not larger or smaller than that of a reference image. Here, the correction of the read image is previously determined according to the variation in transfer speed.

When the document P is transferred at the second transfer speed while the back end of the document is transferred to the second reading unit 32 after passing through the first transfer roller 20 and the first reading unit 31, the second reading unit 32 corrects the read image such that the length of the read image is not larger or smaller than that of the reference image. Here, the correction of the read image is previously determined according to the variation in transfer speed.

According to the present general inventive concept, first and second sub-images can be generated from the read first and second sides of the document P by the first reading unit 31 and the second reading unit 32 at first and second speeds and can be changed to first and second images having a same size of the document P.

According to the present general inventive concept, first and second sub-images can be generated from the read first and second sides of the document P by the first reading unit 31 and the second reading unit 32 and can be corrected to the first and second images to correspond to the document P.

According to the present general inventive concept, first and second sub-images can be generated from the read first and second sides of the document P by the first reading unit 31 and the second reading unit 32, and can be compensated for a difference between the first and second transfer speeds, so that the first and second images correspond to an original size of the document P.

The control unit 90 can control the first and second reading units to read the first and second sides transferred at the first and second speeds, at a predetermined speed to generate the first and second images to correspond to the document P.

The first and second transfer units can transfer the document P at a third speed, the first and second reading units 31 and 32 may read the document P at the third speed, and the control unit 90 can generate the first and second images according to the read document P at the third speed.

The first reading unit 31 reads a plurality of portions of the first side of the document P at different first speeds, the second reading unit 32 reads a plurality of portions of the second side of the document P at different second speeds, and the control unit 90 generates the first and second images according to the plurality of portions of the first and second sides of the document P at the different first and second speeds.

Also, according to the present general inventive concept, the first reading unit 31 reads a first side of a document P at a first transfer speed, and a second reading unit to read a second side of the document P at a second transfer speed.

Also, according to the present general inventive concept, a reading unit can read a portion of a document at a speed and to read another portion of the document at another speed. That is, the reading unit reads portions of a side of a document at different speeds. According to the present embodiment, two transfer units transfer the document at different speeds, and the reading unit reads the portions of the side of the document which is transferred at the different speeds. When the document is transferred at the different speeds, the reading unit reads the document and generates an image corresponding to a measurement of the document.

As described above, in the present embodiment, the transfer speed of the document P transferred by the first transfer roller 20 is set to be different from the transfer speed of the document P transferred by the second transfer roller 40. A difference in speed may be smaller or larger than a reference value. In a process of manufacturing the apparatus, a difference may occur in transfer speed of the document P transferred in the transfer sections.

In the present embodiment, it was tested whether a difference in transfer speed is equal to a reference value using a test document on which a pattern is recorded, and whether the first transfer speed of the first transfer roller 20 and the second transfer speed of the second transfer roller 40 are corrected according to the test result.

Figure 3:
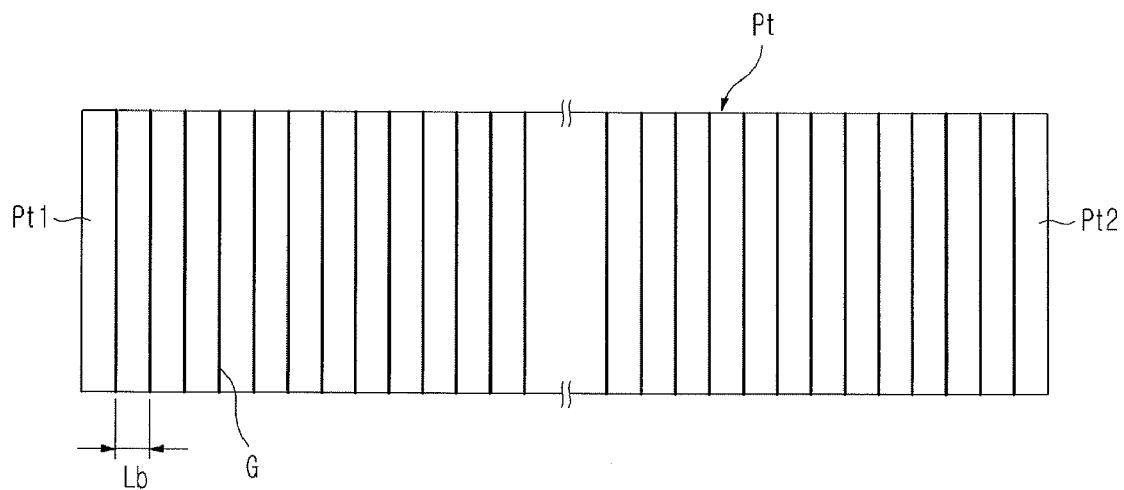
FIG. 3 is a view illustrating a test document, on which an image pattern is recorded, according to an embodiment of the present general inventive concept.

A plurality of patterns, such as black bands (black lines) G, was recorded on the front side and the back side of the test document Pt as illustrated in FIG. 3. The black bands G are repeatedly recorded from the front end Pt1 to the back end Pt2 of the test document Pt at a predetermined gap Lb.

Figure 4:
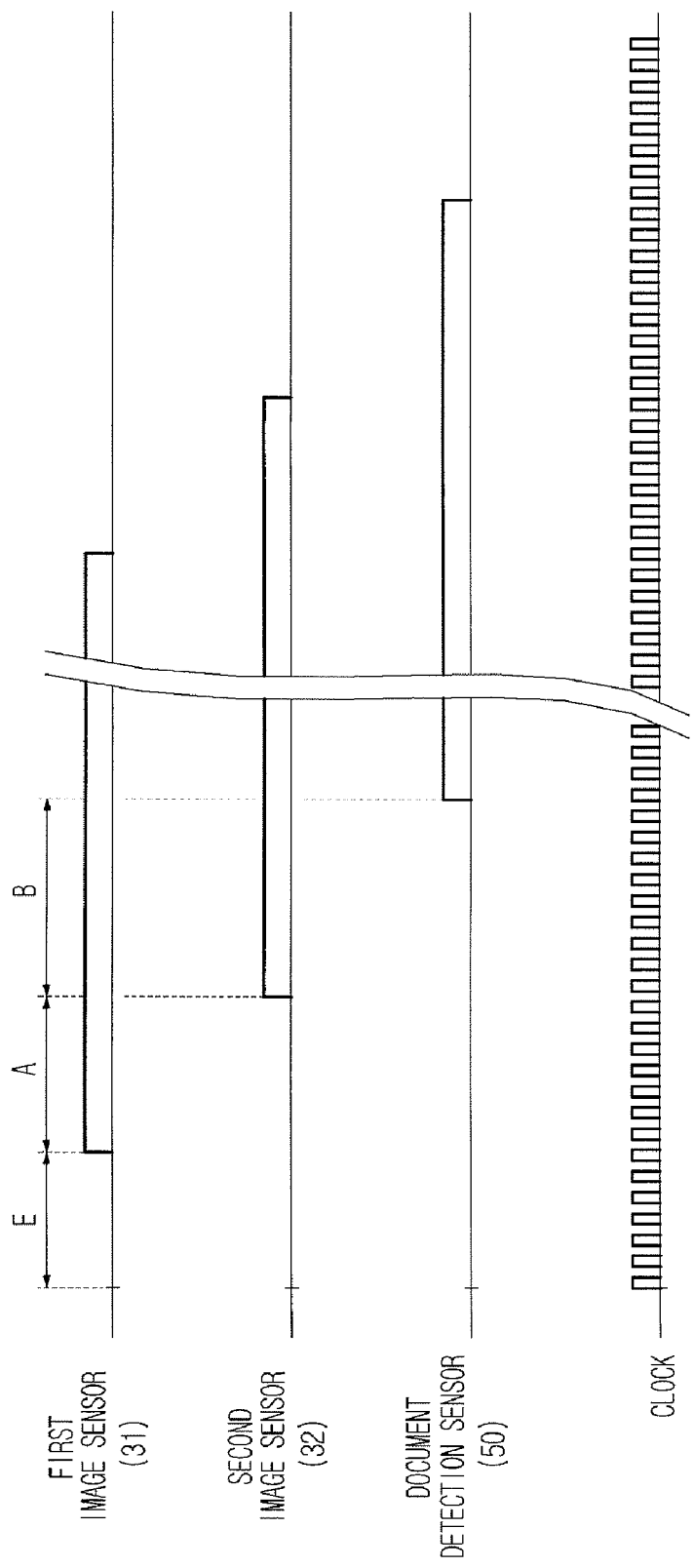
FIG. 4 is a view illustrating timings of an image sensor and a document detection sensor according to an embodiment of the present general inventive concept.

FIG. 4 illustrated driving timings of the first image sensor 31, the second image sensor 32 and the document detection sensor 50 when the test document Pt is loaded on the document load table 10 and is transferred along the transfer path 1.

Referring to FIGS. 1, 2 and 3, a clock is a pulse having a predetermined frequency, which is internally generated by the control unit 90. This clock is counted so as to compensate for a variation in transfer speed.

The first and second image sensors 31 and 32 read the bands G recorded on the front side and the back side of the test document Pt and provide read image data to the control unit 90. The control unit 90 recognizes the black bands G using an algorithm to process image data.

The control unit 90 counts the clocks from one black band G to a next black band G and calculates transfer times of the black bands G passing through the image sensor 20 or 40 according to the counted value. In order to improve reliability in the transfer time, the transfer times of the black bands G are measured for a predetermined number of times and the measured transfer times are arithmetically averaged to calculate an average transfer time.

Next, the control unit 90 may calculate the transfer speed on the basis of the gap Lb between the black bands G and the average transfer time. That is, although the black bands G of the test document Pt are recorded at the same gap, the number of clocks generated in the gap Lb between the black bands G varies according to the transfer speed. Thus, the transfer speed can be calculated on the basis of the variation in number of clocks.

The control unit 90 stores in the memory unit 70 a first compensation value of the first transfer speed and a second compensation value of the second transfer speed, both of which are obtained on the basis of information on the transfer speed measured while the test document Pt is transferred, and controls the driving unit 130 according to compensation information corresponding to the first and second compensation values in the operation to read the document such that the first and second transfer rollers 20 and 40 are driven according to the compensated transfer speeds so as to transfer the test document Pt.

Figure 5A:
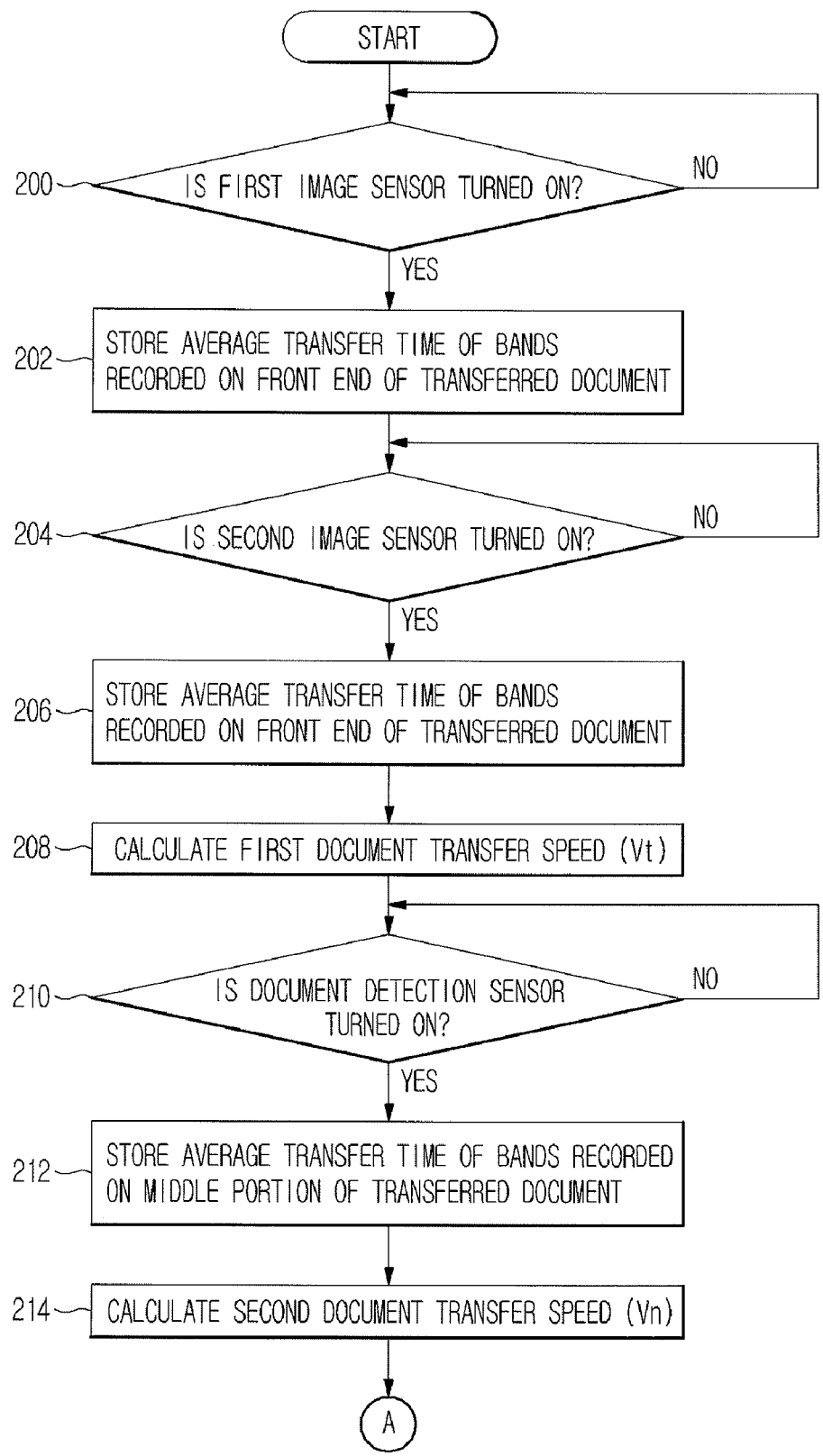
FIGS. 5A and 5B are flowcharts illustrating a method of controlling an image forming apparatus according to an embodiment of the present general inventive concept.
Figure 5B:
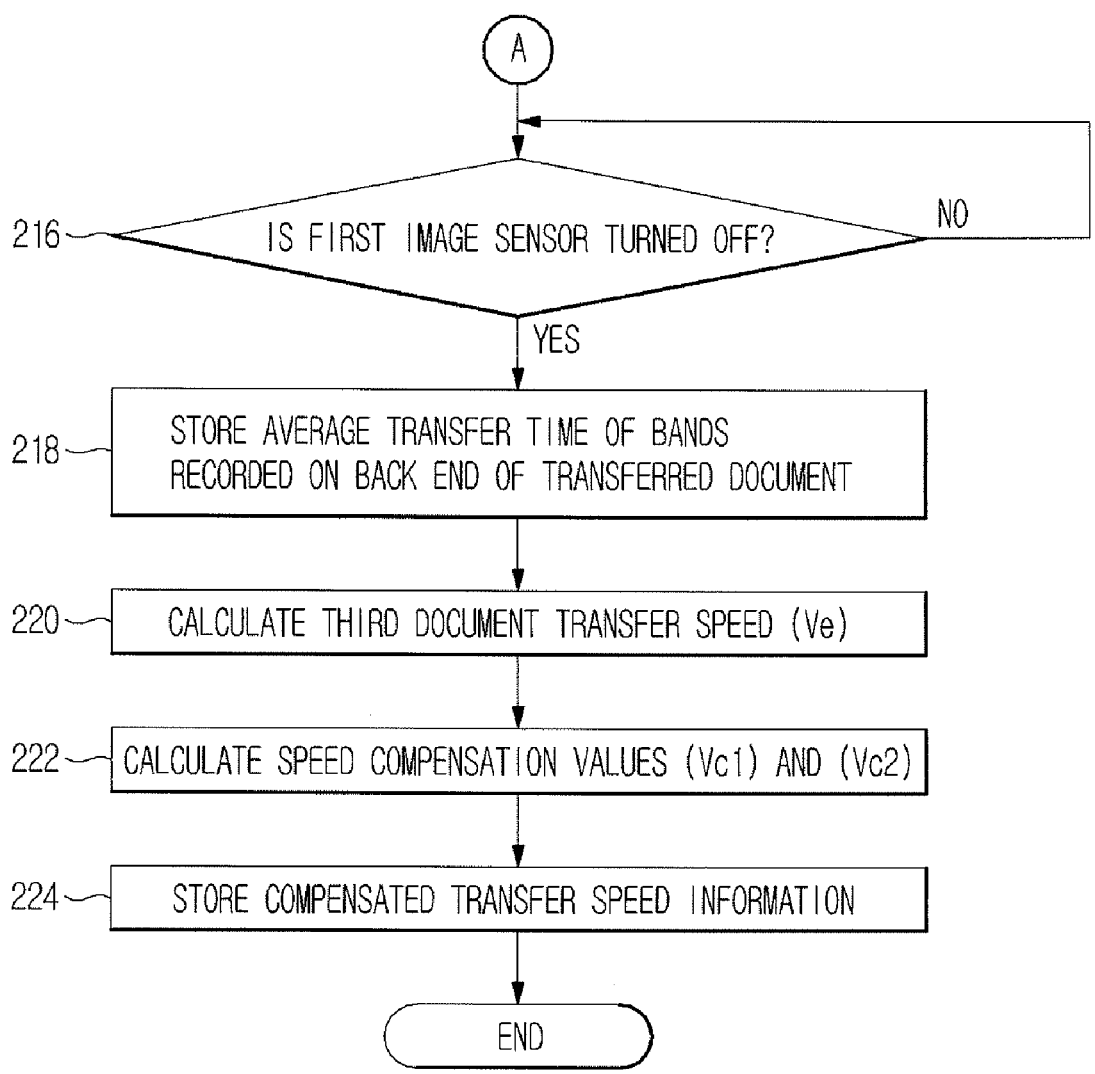

Hereinafter, a method of controlling an image forming apparatus according to an embodiment of the present general inventive concept will be described with reference to FIGS. 5A and 5B.

The test document Pt on which the black bands are recorded at the front side and the back side thereof is loaded on the document load table 10, and the first transfer roller 20 and the second transfer roller 40 are driven so as to generate a predetermined difference in speed under the control of the control unit 90, thereby transferring the test document Pt along the transfer path 1. The test document Pt is transferred to the first image sensor 31 through the first transfer roller 20.

In the process of transferring the document Pt, the control unit 90 determines whether the first image sensor 31 is turned on (200). If it is determined that the first image sensor 31 is turned on, that is, if the front end of the test document Pt passes through the first image sensor 31, then the control unit 90 analyzes the image read by the first image sensor 31, measures the transfer times of the black bands G of the front end of the document Pt using the clock, arithmetically averages the transfer times to calculate an average transfer time, and stores the average transfer time in the memory unit 70 (202).

Next, the control unit 90 determines whether the second image sensor 32 is turned on (204). If it is determined that the second image sensor 32 is turned on, that is, the front end Pt1 of the test document Pt passes through the second image sensor 32, then the control unit 90 analyzes the image read by the second image sensor 32, measures the transfer times of the black bands G of the front end of the document Pt using the clock, arithmetically averages the transfer times to calculate an average transfer time, and stores the average transfer time in the memory unit 70 (206).

Subsequently, a first document transfer speed, that is, the document front-end speed Vt, is calculated using the gap Lb between the black bands G and any one of the average transfer times, which are respectively measured using the first image sensor 20 and the second image sensor 20, or an average value thereof (208).

The transferred test document Pt passes through the document detection sensor 50 through the second transfer roller 40. At this time, the control unit 90 determines whether the document detection sensor 50 is turned on (210). If it is determined that the document detection sensor 50 is turned on and the test document Pt is transferred by the first transfer roller 20 and the second transfer roller 40, the average transfer time of the black bands G recorded on the middle portion of the test document Pt is calculated using the first image sensor 31 or the second image sensor 32 and is stored in the memory unit 70 (212). Then, the control unit 90 calculates a second document transfer speed, that is, the document reference speed Vn, using the gap Lb between the black bands G and the average transfer time (214).

Next, the control unit 90 determines whether the second image sensor 32 is turned off (216). If it is determined that the first image sensor 31 is turned off, that is, the back end of the test document Pt passes through the first image sensor 31, then the image read by the second image sensor 32 is analyzed, the average transfer time of the black bands G recorded on the back end Pt2 of the test document Pt is calculated and is stored in the memory unit 70 (218). Then, the control unit 90 calculates a third transfer speed, that is, the document back-side speed Ve, using the gap Lb between the black bands G and the average transfer time (220).

Then, the control unit 90 calculates a first speed compensation value Vc1 corresponding to a difference between a predetermined document front-end speed and a document front-end speed obtained by measurement and calculation and calculates a second speed compensation value Vc2 corresponding to a difference between a predetermined document back-end speed and a document back-end speed obtained by measurement and calculation (222).

Next, the control unit 90 stores information on the document front-end speed and the document back-side speed, both of which are compensated according to the first and second speed compensation values, in the memory unit 70 (224).

When a document P is loaded and transferred along the transfer pan 1 as illustrated in FIG. 1, the control unit 90 controls the driving unit 130 such that the first transfer roller 20 is driven at the compensated first transfer speed stored in the memory unit 70 and the second transfer roller 40 is driven at the compensated second transfer speed, when the document is transferred so as to read the image on the document.

In the present embodiment, a distance between the first transfer roller 20 and the second transfer roller 40 may be smaller than a minimum length of the document P which can be transferred. An additional transfer unit may be positioned between the first transfer roller 20 and the second transfer roller 40.

Although, in the present general inventive concept, the first transfer roller 20 and the second transfer roller 40 are used, a unit which includes a rigid shaft and a member surrounding the shaft and made of rubber and plastic and can transfer the document may be used. The first transfer roller 20 and the second transfer roller 40 are not limited to a roller type. That is, the document may be transferred using a transfer belt or a suction device. Alternatively, the document may be electrostatically attached by the injection of charges and be transferred.

As described above, according to the present general inventive concept, a reading unit corrects a read image according to a variation in transfer speed of a document transferred by a plurality of transfer rollers so as to prevent deterioration in quality of the read image. Since compensation values of the transfer speeds of the transfer rollers are obtained using a test document on which bands are recorded at a predetermined gap and are used when the transfer rollers are driven so as to read the document, the variation in transfer speed is removed and thus the quality of a read image can be efficiently prevented from deteriorating.

Although a few embodiments of the present general inventive concept have been shown and described, it would be appreciated by those skilled in the art that changes may be made in these embodiments without departing from the principles and spirit of the general inventive concept, the scope of which is defined in the claims and their equivalents.

What is claimed is:

1. A read device comprising:
    a first transfer unit and a second transfer unit to transfer a document along a transfer path at a first transfer speed and a second transfer speed, respectively;
    a first reading unit and a second reading unit disposed between the first transfer unit and the second transfer unit to read a first side and a second side of the document at the first transfer speed and the second transfer speed, respectively, and
    a control unit to generate first and second images according to the read first and second sides of the document, and to compensate the first and second images for a difference between the first and second transfer speeds, so that the first and second images correspond to an original size of the document.

2. The read device according to claim 1, wherein the second transfer speed is higher than the first transfer speed.

3. The read device according to claim 1, wherein the second transfer unit transfers the document at the second transfer speed after the document passes through the first transfer unit.

4. The read device according to claim 1, wherein, when the document is transferred by the first and second transfer units, the document is transferred at a third transfer speed.

5. The read device according to claim 4, wherein the third transfer speed is higher than the first transfer speed and is lower than the second transfer speed.

6. The read device according to claim 1, wherein, while a back end of the document is transferred to the first reading unit after passing through the first transfer unit, at least one of the first and second reading units corrects a read image.

7. The read device according to claim 1, wherein, while a back end of the document is transferred to the second reading unit after passing through the first transfer unit and the first reading unit, the second reading unit corrects a read image.

8. The read device according to claim 1, further comprising:
    at least one document detection sensor to sense a transfer position of the document,
    wherein the document detection sensor is provided at a front stage or a back stage of at least one of the first and second transfer units.

9. An image forming apparatus comprising:
    a test document on which an image pattern is recorded;
    a transfer member to transfer a document along a document transfer path;
    a read device to read an image on the document transferred by the transfer member; and
    a control unit to read the image pattern on the test document transferred along the document transfer path using the read device, acquire speed compensation information to compensate for a transfer speed of the transfer member, and control an operation of the transfer member according to the speed compensation information at the time of transferring the document.

10. The image forming apparatus according to claim 9, wherein the transfer member includes first and second transfer rollers which are respectively mounted at upstream and downstream sides of the document transfer path, and a driving unit to drive the first and second transfer rollers such that the speed of the second transfer roller is higher than that of the first transfer roller, under the control of the control unit, is further included.

11. The image forming apparatus according to claim 10, wherein:
    the read device includes a plurality of image sensors which are mounted between the first transfer roller and the second transfer roller to be separated from each other, and
    the image pattern is read by the plurality of image sensors, the control unit analyzes the image pattern read by the image sensors and acquires speed compensation information of the first and second transfer rollers.

12. The image forming apparatus according to claim 11, wherein:
    the image pattern includes a plurality of bands recorded at a predetermined gap, and
    the control unit calculates transfer times of the document using a clock having a predetermined frequency while any one band and a next band thereof are recognized by the image sensor.

13. The image forming apparatus according to claim 12, wherein the control unit calculates a transfer speed using the gap between the bands and an average transfer time obtained by arithmetically averaging the transfer times of the document.

14. The image forming apparatus according to claim 13, wherein, in a first transfer speed which depends on only the first transfer roller, a second transfer speed which depends on only the second transfer roller and a third transfer speed which depends on the first and second transfer rollers, the control unit acquires a first speed compensation value to compensate for a difference between the first transfer speed and a transfer speed which is calculated in correspondence therewith and a second speed compensation value to compensate for a difference between the second transfer speed and a transfer speed which is calculated in correspondence therewith as speed compensation information.

15. A method of controlling an image forming apparatus including a transfer member to transfer a document and a read device to read an image on the document transferred by the transfer member, the method comprising:

driving the transfer member at a predetermined transfer speed and transferring a test document on which an image pattern is recorded;

reading the image pattern on the test document by the read device, analyzing the image pattern read by the read device, and acquiring speed compensation information of the transfer member;

storing the acquired speed compensation information; and controlling the transfer member according to the stored speed compensation information when the image on the document is read.

16. The method according to claim 15, wherein:

the image pattern includes bands recorded at a predetermined gap, and the analyzing of the image pattern includes calculating a compensation value according to a difference between a transfer speed of the document in a transfer section and a predetermined speed.

17. An image forming apparatus comprising:

a first transfer unit and a second transfer unit to transfer a document along a transfer path at a first transfer speed and a second transfer speed, respectively;

a first reading unit and a second reading unit disposed between the first transfer unit and the second transfer unit to read a first side and a second side of the document at the first transfer speed and the second transfer speed, respectively; and a control unit to generate first and second images according to the read first and second sides of the document, wherein the control unit compensates the first and second images for a difference between the first and second transfer speeds, so that the first and second images correspond to an original size of the document.

18. The image forming apparatus according to claim 17, wherein:

the document comprises a test document having predetermined patterns;

the first and second reading units read the predetermined patterns of the test document; and the control unit generates compensation information according to the read predetermined patterns of the test document, and generates the first and second images according to the compensation information.

19. The image forming apparatus according to claim 17, wherein the control unit changes first and second sub-images of the read first and second sides of the document at first and second speeds to the first and second images having a same size of the document.

20. The image forming apparatus according to claim 17, wherein the control unit corrects first and second sub-images of the read first and second sides of the document to the first and second images to correspond to the document.

21. The image forming apparatus according to claim 17, wherein the control unit controls the first and second reading units to read the first and second sides transferred at the first and second speeds, at a predetermined speed to generate the first and second images to correspond to the document.

22. The image forming apparatus according to claim 17, wherein:

the first and second transfer units transfer the document at a third speed;

the first and second reading units read the document at the third speed; and the control unit generate the first and second images according to the read document the third speed.

23. The image forming apparatus according to claim 17, wherein:

the first reading unit reads a plurality of portions of the first side of the document at different first speeds;

the second reading unit reads a plurality of portions of the second side of the document at different second speeds; and the control unit generates the first and second images according to the plurality of portions of the first and second sides of the documents at the different first and second speeds.

24. An image forming apparatus comprising:

a first reading unit to read a first side of a document at a first transfer speed;

a second reading unit to read a second side of a document at a second transfer speed; and a control unit to generate first and second images according to the read first and second sides of the document, and to compensate the first and second images for a difference between the first and second transfer speeds, so that the first and second images correspond to an original size of the document.

25. An image forming apparatus comprising:

a reading unit to read a portion of a document at a speed and to read another portion of the document at another speed; and a control unit to generate first and second image images according to the read first and second sides of the document, and to compensate first and second images for a difference between the first and second transfer speeds, so that the first and second images correspond to an original size of the document.

* * * * *